(12) United States Patent
Moles et al.

(10) Patent No.: US 6,615,038 B1
(45) Date of Patent: Sep. 2, 2003

(54) SYSTEM AND METHOD FOR AUTOMATICALLY CREATING AND UPDATING A MOBILE STATION CONFIGURATION DATABASE IN A WIRELESS NETWORK

(75) Inventors: Bryan J. Moles, Dallas, TX (US); Sudhindra P. Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/560,791

(22) Filed: Apr. 28, 2000

(51) Int. Cl.[7] ................................................ H04M 3/00
(52) U.S. Cl. ........................ 455/418; 455/419; 455/466
(58) Field of Search ................................ 455/432, 433, 455/435, 455, 458, 418, 419, 466; 370/400, 401, 402

(56) References Cited

U.S. PATENT DOCUMENTS 5,915,225 A * 6/1999 Mills .......................... 455/558
6,269,244 B1 * 7/2001 Alperovich et al. ......... 455/433
6,301,484 B1 * 10/2001 Rogers et al. ............... 455/466
6,363,249 B1 * 3/2002 Nordeman et al. .......... 455/418

* cited by examiner

Primary Examiner—Daniel Hunter
Assistant Examiner—Tuan Tran

(57) ABSTRACT

There is disclosed, for use in a wireless network comprising a group of base stations that communicate with a group of mobile stations, an apparatus for automatically gathering configuration data associated with the mobile stations. The apparatus comprises: 1) a database for storing a plurality of mobile station configuration records, wherein each of the mobile station configuration records stores configuration data gathered from a selected one of the mobile stations; and 2) an update controller for transmitting to a first mobile station a mobile station configuration request message and for receiving from the first mobile station first configuration data transmitted by the first mobile station in response to receipt of the mobile station configuration request message. The update controller stores the first configuration data in a first configuration record.

20 Claims, 4 Drawing Sheets

SYSTEM AND METHOD FOR AUTOMATICALLY CREATING AND UPDATING A MOBILE STATION CONFIGURATION DATABASE IN A WIRELESS NETWORK

TECHNICAL FIELD OF THE INVENTION

The present invention is directed, in general, to wireless networks and, more specifically, to a system for automatically creating and updating a handset configuration database in a wireless service provider's network and for performing over-the-air (OTA) updating of mobile phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G wireless modem) may be used to browse web sites on the Internet, to transmit and receive graphics, to execute streaming audio and/or video applications, and the like. In sum, a higher percentage of wireless traffic handled by 3G wireless devices will be Internet protocol (IP) traffic and a lesser percentage will be traditional voice traffic.

To maximize subscriber convenience, many wireless service providers try to automate as much as possible the process of enrolling new subscribers and activating their new mobile stations, including both current wireless devices and the new 3G wireless devices. A new subscriber can buy a mobile station, such as a cellular phone handset, in a supermarket and can activate it by calling a special telephone number, such as "*288xx" where "xx" is a unique number for each wireless service provider. Dialing this number connects the new subscriber to an operator who collects needed information, such as the new subscriber's name, address, and credit card information, the type or level of service that the new subscriber wants, and the like. When the account information is collected and the account is set up, the operator instructs the handset buyer to enter several sequences of passwords, code numbers, menu-selected commands, and the like, that enable certain functions in the handset.

This procedure is known as "service provisioning." Service provisioning initiates an over-the-air (OTA) process that activates in the cellular handset a Number Assignment Module (NAM), which gives the handset a unique phone number for incoming calls and provides a roaming capability by identifying approved wireless carriers. Service provisioning also activates in the handset a Preferred Roaming List (PRL), which is a list of frequency bands owned by each carrier in each geographical region and which may identify preferred and prohibited frequencies in each region. Additionally, service provisioning activates an authentication code, sometimes referred to as an "A-key," in the cellular handset. The handset uses the A-key to authenticate the handset to a wireless network when the subscriber attempts to access the wireless network.

Despite this level of automation, many aspects of providing wireless service to a subscriber depend largely on manual labor. For example, wireless service providers frequently maintain a database containing configuration information about each subscriber's mobile station. This database is maintained because wireless service providers typically make available to their subscribers a number of different types of handsets. For example, a wireless service provider, such as AT&T, may sell mobile phones from Nokia, Motorola and Samsung directly to subscribers through a supermarket chain. The configuration information stored in the database typically includes a mobile station manufacturer identification code, a hardware revision code, a software revision code, and the like. Wireless service providers maintain the database in order to inform customers about handset defects, handset upgrades, and the like.

Entering the configuration data into the database, however, remains a largely manual process. For example, during service provisioning, the operator may ask the subscriber for the cell phone serial number or the cell phone manufacturer and model number. The operator then manually enters the information related by the user into the database. Alternatively, the wireless service provider may enter all of this information manually before the mobile stations are distributed to subscribers via supermarkets, mail order, on-line purchase, or other channels of trade. There are numerous drawbacks to these methods of populating the mobile station database with information about each mobile station. Obviously, it is labor intensive and therefore increases operating costs. Additionally, the participation by a human operator or a human subscriber introduces errors into the process. The subscriber may relate inaccurate information. Even if the subscriber does not make an error, the operator may incorrectly enter the information Therefore, there is a need in the art for improved systems and methods for creating and maintaining in a wireless service provider's network a database containing configuration data about subscribers, wireless phone handsets and other types of mobile stations. In particular, there is a need for improved systems and methods for creating and maintaining a mobile station configuration database that minimizes the amount of human intervention involved. More particularly, there is a need for improved systems and methods for automatically creating and maintaining a mobile station configuration database that does not require intervention by the subscriber or a system operator.

SUMMARY OF THE INVENTION

To address the above-discussed deficiencies of the prior art, it is a primary object of the present invention to provide, for use in a wireless network comprising a plurality of base stations, each of the base stations capable of communicating with a plurality of mobile stations, an apparatus for automatically gathering configuration data associated with the plurality of mobile stations. According to an advantageous embodiment of the present invention, the apparatus comprises: 1) a database capable of storing a plurality of mobile station configuration records, wherein each of the mobile station configuration records stores configuration data gathered from a selected one of the plurality of mobile stations; and 2) an update controller capable of transmitting to a first one of the plurality of mobile stations a mobile station configuration request message and further capable of receiving from the first mobile station first configuration data transmitted by the first mobile station in response to receipt of the mobile station configuration request message, wherein the update controller stores the first configuration data in a first one of the mobile station configuration records.

The present invention takes advantage of the fact that current generation wireless devices and the new 3G wireless devices already contain all of the necessary configuration information required by the mobile station configuration database and are capable of relating this configuration information to the wireless service provider via over the air messages.

According to one embodiment of the present invention, the update controller is capable of receiving an upgrade data file comprising second configuration data from a manufacturer of the first mobile station via an Internet protocol (IP) communication network coupled to the wireless network.

According to another embodiment of the present invention, the update controller receives the upgrade data file in response to an upgrade request message transmitted by the update controller to the manufacturer of the first mobile station.

According to still another embodiment of the present invention, the update controller is capable of replacing the first configuration data in the first mobile station configuration record with the second configuration data.

According to yet another embodiment of the present invention, the update controller is capable of transmitting the second configuration data to the first mobile station.

According to a further embodiment of the present invention, the update controller is capable of transmitting an upgrade alert message to the first mobile station, wherein the upgrade alert message notifies a user of the first mobile station that the second configuration data is available to replace the first configuration data in the first mobile station.

According to a still further embodiment of the present invention, the update controller is capable of receiving an acknowledgment message from the first mobile station transmitted in response to the upgrade alert message, wherein the update controller, in response to receipt of the acknowledgment message, replaces the first configuration data in the first mobile station configuration record with the second configuration data.

According to a yet further embodiment of the present invention, the first configuration data comprises a first indicia indicating a hardware version of the first mobile station and a second indicia indicating a software version of the first mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
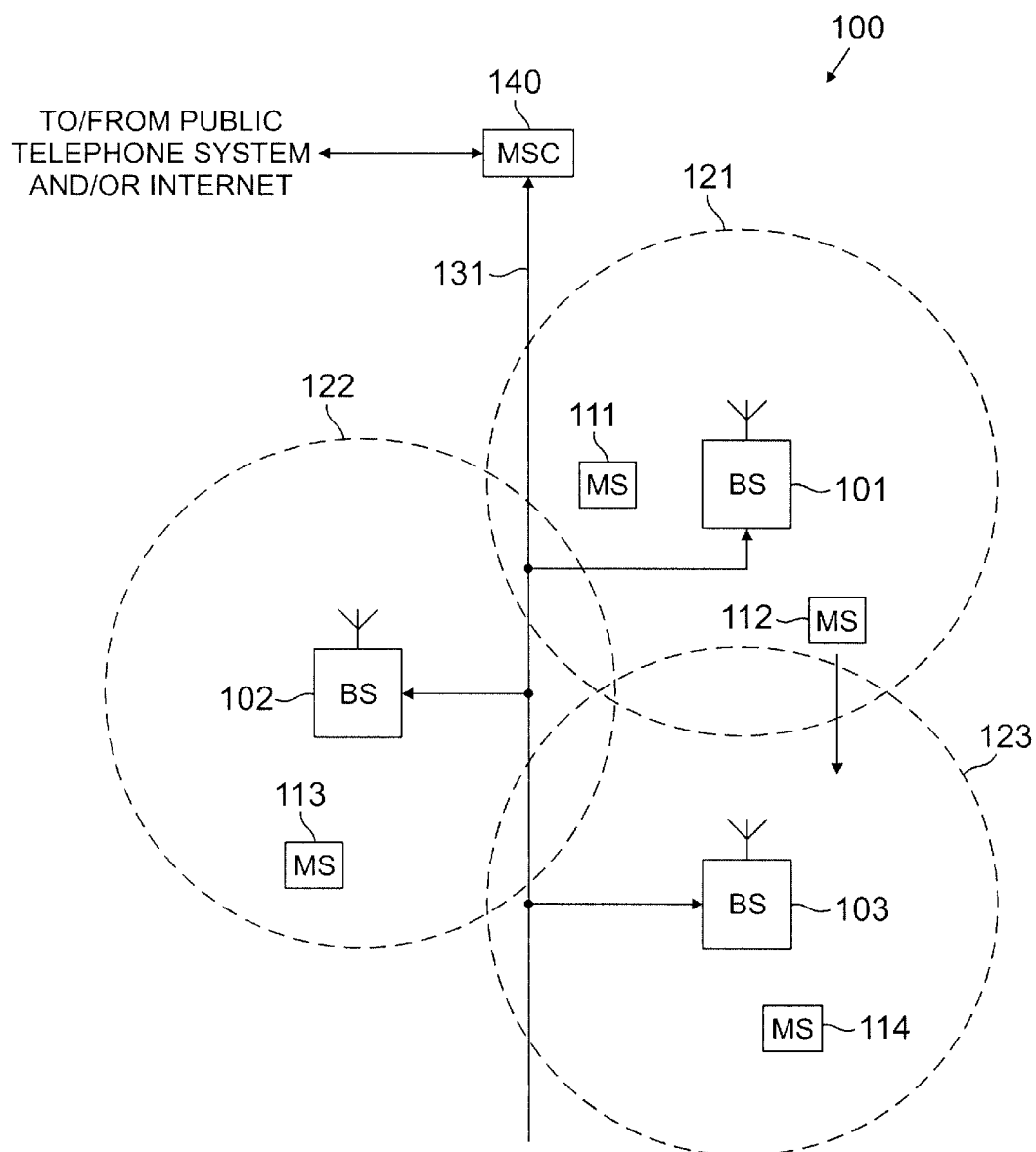
FIG. 1 illustrates a general overview of an exemplary wireless network according to one embodiment of the present invention.

FIG. 1 illustrates a general overview of an exemplary wireless network 100 according to one embodiment of the present invention. Wireless telephone network 100 comprises a plurality of cell sites 121–123, each containing one of the base stations, BS 101, BS 102, or BS 103. Base stations 101–103 are capable of communicating with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
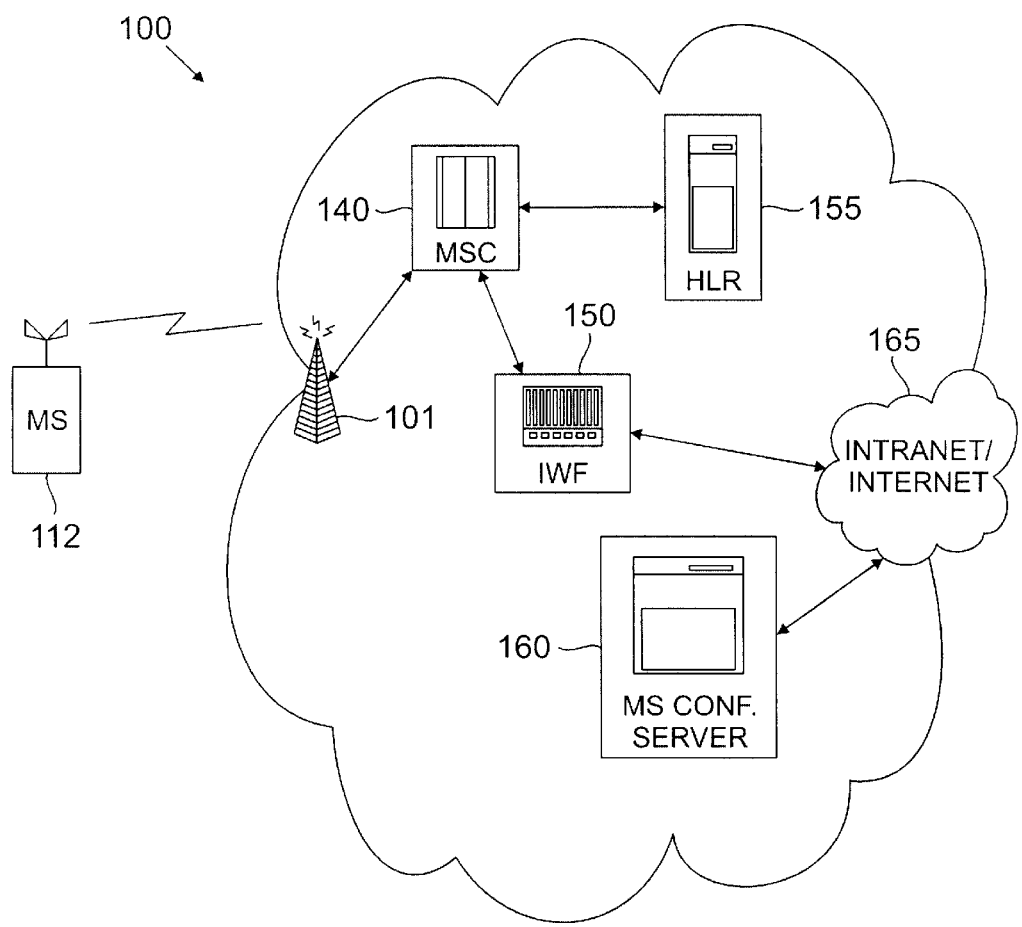
FIG. 2 illustrates an alternate view of selected portions of the exemplary wireless network in FIG. 1 that create and maintain a mobile station configuration database and that perform over-the-air (OTA) updates of mobile station configurations according to one embodiment of the present invention.

FIG. 2 illustrates an alternate view of selected portions of exemplary wireless network 100 that create and maintain a mobile station configuration database and that perform over-the-air (OTA) updates of mobile station configurations according to one embodiment of the present invention. MS 112, BS 101 and MSC 140 are still present, as in FIG. 1. In FIG. 2, wireless network 100 further comprises interworking function (IWF) 150, home location register (HLR) 155, and mobile station configuration server 160. Mobile station configuration server 160 is a system-wide central server that is located remote from the other components of wireless network 100, namely, BS 101, MSC 140, IWF 150 and HLR 155. In order to access data in mobile station configuration server 160, MSC 140 communicates with mobile station configuration server 160 via intranet/Internet 165 (hereafter "Internet 165"). Since data within wireless network 100 may be communicated in one or more of a wide variety of communication protocols, according to the choices made by the wireless service provider, IWF 150 is needed to translate the "native" communication transport protocol that carries application data in wireless network 100 into Internet protocol (IP) based data packets suitable for transmission in Internet 165.

As will be explained below in greater detail, when an unprovisioned mobile station, such as MS 112, accesses wireless network 100 (via BS 101), then BS 101 and/or MSC 140, using the handset data in HLR 155, identifies MS 112 as an unprovisioned handset and performs an over-the-air (OTA) service provisioning of MS 112. Either during the service provisioning or at a subsequent time, mobile station configuration server 160 gathers configuration data from MS 112 and stores it in a configuration record in a database. Thereafter, mobile station configuration server 160 may from time to time transmit mobile station updates to MS 112 to correct software defects or to add new features. Advantageously, HLR 155 only needs to store the minimum amount of data to authenticate MS 112 and to establish a connection to the provisioning server. All of the remaining data needed for the network to determine upgrades information is stored in mobile station configuration server 160.

It should be noted that the scope of the present invention is not limited to wireless networks that use the Internet to link base stations in wireless network 100 with mobile station configuration server 160. In alternate embodiments of the present invention, the Internet may actually be a large intranet having a relatively minimal amount of security that links a group of base stations to mobile station configuration server 160.

Figure 3:
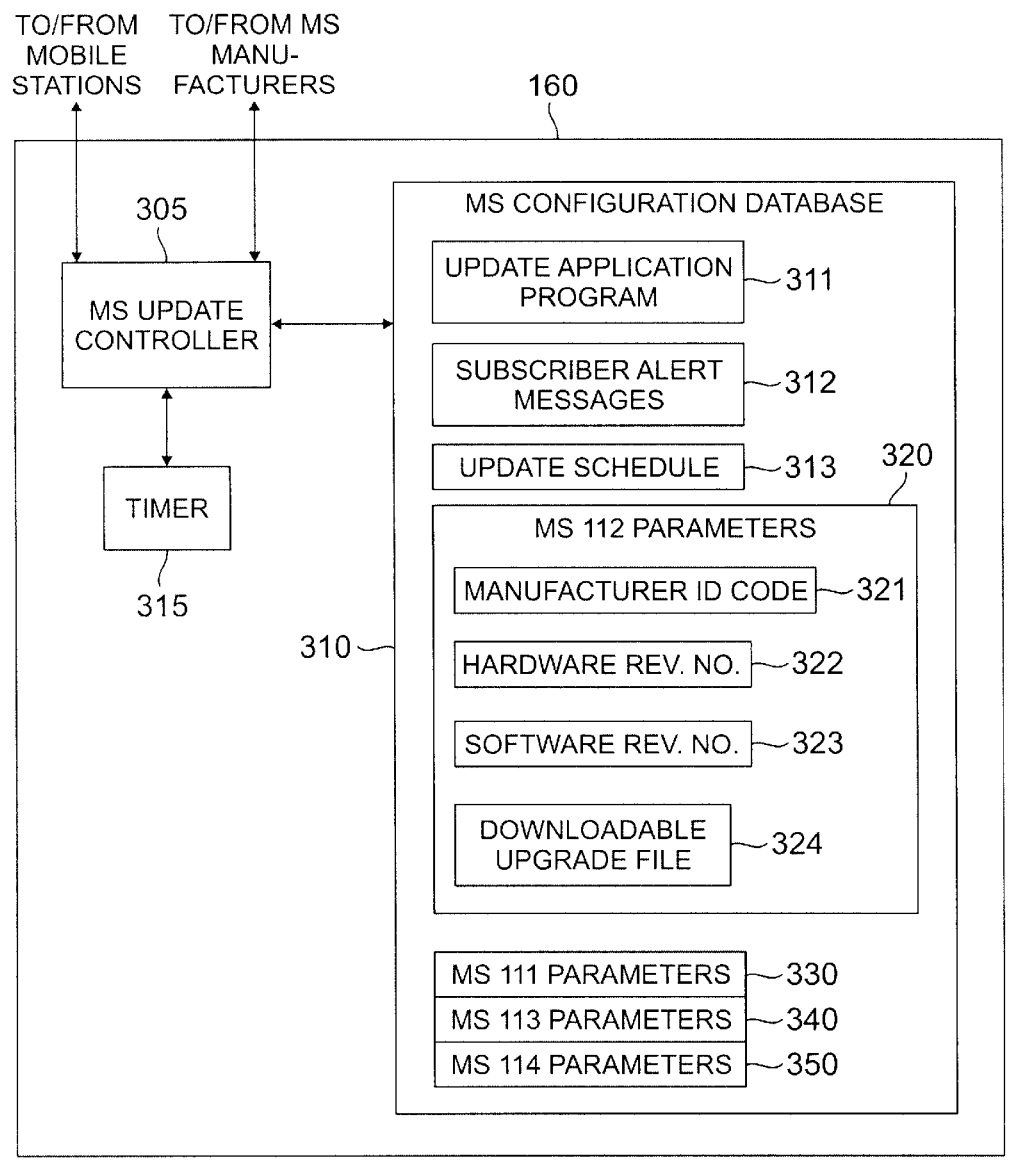
FIG. 3 illustrates in greater detail an exemplary mobile station configuration server according to one embodiment of the present invention.

FIG. 3 illustrates in greater detail exemplary mobile station (MS) configuration server 160 according to one embodiment of the present invention. Mobile station configuration server 160 comprises mobile station (MS) update controller 305, mobile station (MS) configuration database 310, and timer 315. Mobile station (MS) configuration database 310 is a memory storage device that stores update application program 311, subscriber alert messages file 312, update schedule file 313, and mobile station parameters files 320, 330, 340 and 350. Mobile station parameters files 320, 330, 340 and 350 are labeled MS 112 Parameters, MS 111 Parameters, MS 113 Parameters, and MS 114 Parameters, respectively.

Mobile station parameters file 320 stores configuration data associated with mobile station (MS) 112, including manufacturer identification (ID) code 321, hardware revision number 322, software revision number 323, and downloadable upgrade file 324. Downloadable upgrade file 324 stores the most recent manufacturer supplied software for MS 112. Mobile station parameters files 330, 340 and 350 store similar configuration data files for MS 111, MS 113, and MS 114, respectively.

Mobile station update controller 305 operates under the direction of update application program 311 to coordinate communications with MS 111–114, other devices in wireless network 100, and the various manufacturers of different model handsets through Internet 165. Mobile station update controller 305 gathers initial configuration data (i.e., manufacturer identification code, hardware revision number, and software revision number) from MS 111–114 through MSC 140 and IWF 150 during the time that each handset is being provisioned or at a subsequent time. In either case, mobile station update controller 305 stores the initial configuration data for each handset MS 111–114 in the respective mobile station parameters file 320, 330, 340 and 350.

Periodically, as determined by update schedule 313, mobile station update controller 305 may request a copy of the latest software revision for MS 111–114 from the manufacturer of each handset. Subsequently, mobile station update controller 305 stores the software received from the manufacturers, if any, in the appropriate downloadable upgrade file in mobile station parameters files 320, 330, 340 and 350. For example, software upgrades for MS 112 are stored in downloadable upgrade file 324. In an alternate embodiment, mobile station update controller 305 may respond to a software update alert message transmitted by a handset manufacturer by requesting and storing updated software in one or more appropriate downloadable upgrade files for MS 111–114.

Timer 315 generates timing signals used by mobile station update controller 305 to perform periodic or scheduled communications between mobile station update controller 305, devices in wireless network 100, and mobile station handset manufacturers. According to the scheduling data stored in update schedule file 313, mobile station update controller 305 may generate periodic queries to handset manufacturers, transmit downloadable upgrade files to selected handsets according to one or more schedules, transmit one or more subscriber alert messages from subscriber alert messages file 312 to one or more handsets MS 111–114, request periodic updates of handset supplied configuration data, and the like.

Mobile station update controller 305 may periodically transfer one or more subscriber alert messages in subscriber alert messages file 312 to one or more handsets MS 111–114. For example, mobile station update controller 305 may transfer a software revision alert message to MS 112 that prevents MS 112 from making or receiving other calls via wireless network 100 in order to allow a software upgrade to be downloaded to MS 112. After a predetermined delay or upon acknowledgment by the user of MS 112, mobile station update controller 305 may then transfer downloadable upgrade file 324 to handset MS 112 through Internet 165 and wireless network 100.

As another example, mobile station update controller 305 may transfer a particular warning message in subscriber alert messages file 312 to one or more handsets MS 111–114 having a specific manufacturer identification code and a hardware revision number within a specified range of hardware revision numbers. Alternatively, update schedule file 313 may indicate that mobile station update controller 305 is to periodically transfer a particular message in subscriber alert messages file 312 to all handsets with a particular manufacturer identification code in mobile station configuration database 310. Subsequently, mobile station update controller 305 examines manufacturer identification codes in mobile station parameters files 320, 330, 340 and 350 for a match with the indicated manufacturer identification code. If mobile station update controller 305 determines that the manufacturer identification code in a particular mobile station parameter file matches the required manufacturer identification code, mobile station update controller 305 transfers the indicated subscriber alert message to the associated mobile station, MS 112 for example, through Internet 165.

Mobile station update controller 305 may also monitor the status of update schedule file 313 in comparison with timer 315 to determine when software associated with one or more handsets is to be updated. When mobile station update controller 305 determines that the state of timer 315 coincides with the schedule update time interval for a particular manufacturer identification code and range of software revision numbers, mobile station update controller 305 transfers appropriate subscriber alert messages and downloadable upgrade files from one or more mobile station parameters files 320, 330, 340 and 350 to MS 111–114, as required.

Figure 4:
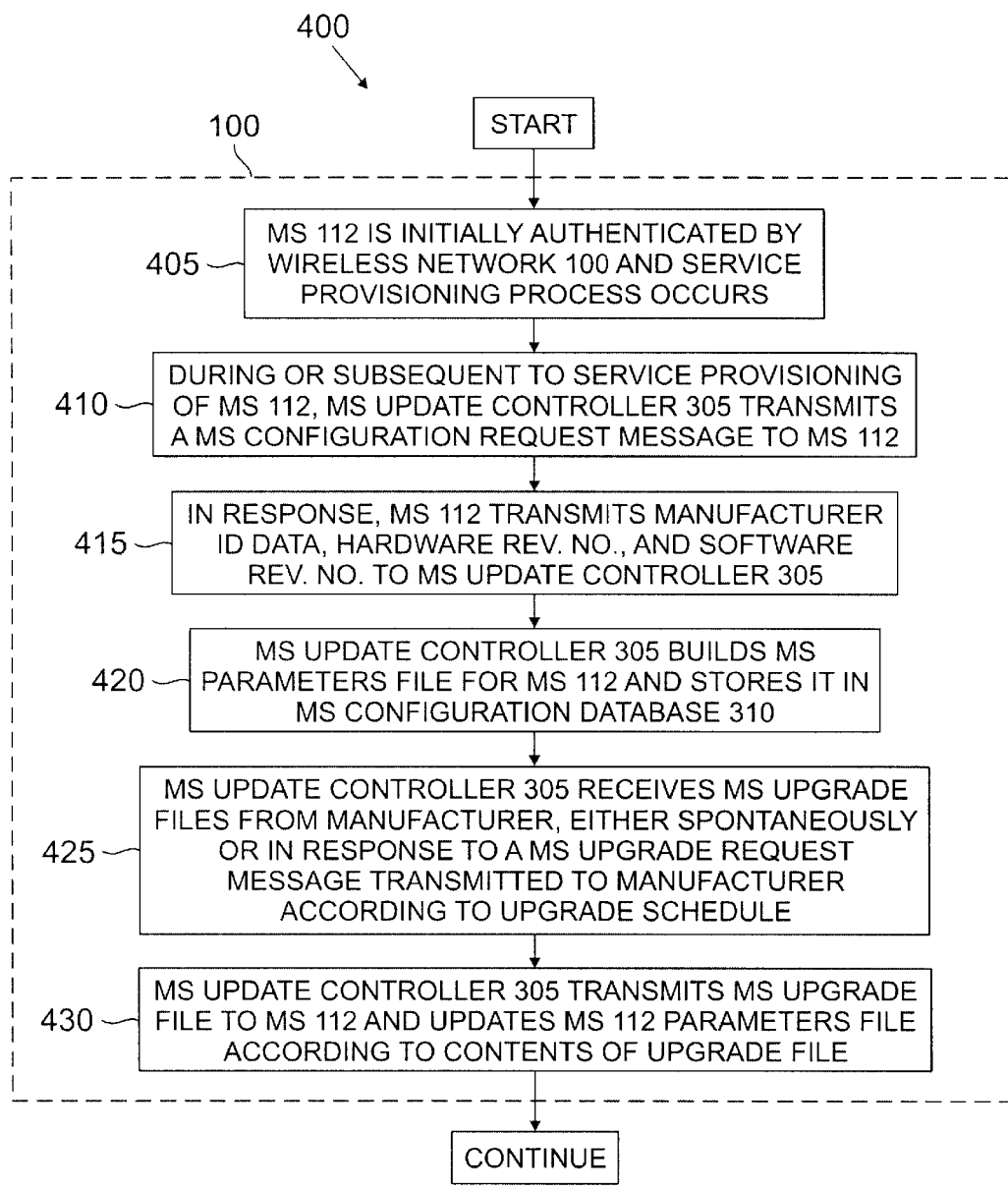
FIG. 4 is a flow diagram illustrating the operation of the exemplary mobile station configuration server in the wireless network according to one embodiment of the present invention.

FIG. 4 depicts flow diagram 400, which illustrates the operation of exemplary mobile station configuration server 160 in wireless network 100 according to one embodiment of the present invention. Under normal operating conditions, MS 112 is initially authenticated and provisioned for service by wireless network 100 (process step 405). During or subsequent to service provisioning for MS 112, mobile station update controller 305 transmits a mobile station configuration request message for MS 112 to IWF 150 through Internet 165 (process step 410). In response to the mobile station configuration request, MS 112 transmits its manufacturer identification data, hardware revision number, and software revision number to mobile station update controller 305 through IWF 150 and Internet 165 (process step 415).

As mobile station update controller 305 receives configuration data from MS 112, mobile station update controller 305 stores the incoming manufacturer identification data, hardware revision number, and software revision number in manufacturer identification code 321, hardware revision number 322, and software revision number 323, respectively (process step 420).

Spontaneously, or in response to a mobile station upgrade request message, mobile station update controller 305 receives mobile station upgrade files for MS 112 from the MS 112 manufacturer. Mobile station update controller stores the incoming mobile station upgrade files in downloadable upgrade file 324 (process step 425). Next, mobile station update controller 305 transmits downloadable upgrade file 324 to MS 112 and updates software revision number 323 in MS 112 Parameters to reflect the revision number associated with the transferred downloadable upgrade file 324 (process step 430).

In an alternate embodiment, mobile station update controller 305 may transfer a software upgrade alert message to MS 112. In response to authorization from MS 112, mobile station update controller 305 may then transfer the contents of downloadable upgrade file 324 to MS 112 and update software revision number 323, as required.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations, each of said base stations capable of communicating with a plurality of mobile stations, an apparatus for automatically gathering configuration data associated with said plurality of mobile stations comprising:

a database capable of storing a plurality of mobile station configuration records, wherein each of said mobile station configuration records stores configuration data gathered from a selected one of said plurality of mobile stations; and an update controller capable of transmitting to a first one of said plurality of mobile stations a mobile station configuration request message and further capable of receiving from said first mobile station first configuration data transmitted by said first mobile station in response to receipt of said mobile station configuration request message, wherein said update controller stores said first configuration data in a first one of said mobile station configuration records, and wherein said update controller is capable of retrieving an upgrade data-file comprising second configuration data from a manufacturer of said first mobile station via an Internet protocol (IP) communication network coupled to said wireless network.

2. The apparatus as set forth in claim 1 wherein said update controller receives said upgrade data file in response to an upgrade request message transmitted by said update controller to said manufacturer of said first mobile station.

3. The apparatus as set forth in claim 1 wherein said update controller is capable of replacing said first configuration data in said first mobile station configuration record with said second configuration data.

4. The apparatus as set forth in claim 3 wherein said update controller is capable of transmitting said second configuration data to said first mobile station.

5. The apparatus as set forth in claim 4 wherein said update controller is capable of transmitting an upgrade alert message to said first mobile station, wherein said upgrade alert message notifies a user of said first mobile station that said second configuration data is available to replace said first configuration data in said first mobile station.

6. The apparatus as set forth in claim 5 wherein said update controller is capable of receiving an acknowledgment message from said first mobile station transmitted in response to said upgrade alert message, wherein said update controller, in response to receipt of said acknowledgment message, replaces said first configuration data in said first mobile station configuration record with said second configuration data.

7. The apparatus as set forth in claim 1 wherein said first configuration data comprises a first indicia indicating a hardware version of said first mobile station and a second indicia indicating a software version of said first mobile station.

8. A wireless network comprising:

a plurality of base stations, each of said base stations capable of communicating with a plurality of mobile stations; and an apparatus for automatically gathering configuration data associated with said plurality of mobile stations comprising:

a database capable of storing a plurality of mobile station configuration records, wherein each of said mobile station configuration records stores configuration data gathered from a selected one of said plurality of mobile stations; and an update controller capable of transmitting to a first one of said plurality of mobile stations a mobile station configuration request message and further capable of receiving from said first mobile station first configuration data transmitted by said first mobile station in response to receipt of said mobile station configuration request message, wherein said update controller stores said first configuration data in a first one of said mobile station configuration records, and wherein said update controller is capable of retrieving an upgrade data file comprising second configuration data from a manufacturer of said first mobile station via an Internet protocol (IP) communication network coupled to said wireless network.

9. The wireless network as set forth in claim 8 wherein said update controller receives said upgrade data file in response to an upgrade request message transmitted by said update controller to said manufacturer of said first mobile station.

10. The wireless network as set forth in claim 8 wherein said update controller is capable of replacing said first configuration data in said first mobile station configuration record with said second configuration data.

11. The wireless network as set forth in claim 10 wherein said update controller is capable of transmitting said second configuration data to said first mobile station.

12. The wireless network as set forth in claim 11 wherein said update controller is capable of transmitting an upgrade alert message to said first mobile station, wherein said upgrade alert message notifies a user of said first mobile station that said second configuration data is available to replace said first configuration data in said first mobile station.

13. The wireless network as set forth in claim 12 wherein said update controller is capable of receiving an acknowledgment message from said first mobile station transmitted in response to said upgrade alert message, wherein said update controller, in response to receipt of said acknowledgment message, replaces said first configuration data in said first mobile station configuration record with said second configuration data.

14. The wireless network as set forth in claim 8 wherein said first configuration data comprises a first indicia indicating a hardware version of said first mobile station and a second indicia indicating a software version of said first mobile station.

15. For use in a wireless network comprising a plurality of base stations, each of the base stations capable of communicating with a plurality of mobile stations, a method for automatically gathering configuration data associated with the plurality of mobile stations comprising the steps of:

creating in a database a plurality of mobile station configuration records, wherein each of the mobile station configuration records stores configuration data gathered from a selected one of the plurality of mobile stations;

transmitting to a first one of the plurality of mobile stations a mobile station configuration request message;

receiving from the first mobile station first configuration data transmitted by the first mobile station in response to receipt of the mobile station configuration request message, wherein the update controller stores the first configuration data in a first one of the mobile station configuration records; and retrieving an upgrade data file comprising second configuration data from a manufacturer of the first mobile station via an Internet protocol (IP) communication network coupled to the wireless network.

16. The method as set forth in claim 15 further comprising the step of receiving the upgrade data file in response to an upgrade request message transmitted to the manufacturer of the first mobile station.

17. The method as set forth in claim 15 further comprising the step of replacing the first configuration data in the first mobile station configuration record with the second configuration data.

18. The method as set forth in claim 17 further comprising the step of transmitting the second configuration data to the first mobile station.

19. The method as set forth in claim 18 further comprising the step of transmitting an upgrade alert message to the first mobile station, wherein the upgrade alert message notifies a user of the first mobile station that the second configuration data is available to replace the first configuration data in the first mobile station.

20. The method as set forth in claim 19 further comprising the step of receiving an acknowledgment message from the first mobile station transmitted in response to the upgrade alert message; and in response to receipt of the acknowledgment message, replacing the first configuration data in the first mobile station configuration record with the second configuration data.

* * * * *